United States Patent
Gangumalla et al.

(10) Patent No.: US 12,280,727 B2
(45) Date of Patent: Apr. 22, 2025

(54) VEHICLE SYSTEM AND METHOD FOR ADJUSTING INTERIOR CONTROL SETTINGS BASED ON DRIVER EMOTION AND ENVIRONMENTAL CONTEXT

(71) Applicant: GM Global Technology Operations LLC, Detroit, MI (US)

(72) Inventors: Aravind Gangumalla, Novi, MI (US); Vikramaditya Nimmagadda, Wixom, MI (US); Arun Adiththan, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 275 days.

(21) Appl. No.: 18/055,190

(22) Filed: Nov. 14, 2022

(65) Prior Publication Data

US 2024/0157896 A1    May 16, 2024

(51) Int. Cl.
   *B60R 16/037*    (2006.01)
   *B60W 10/30*    (2006.01)
   (Continued)

(52) U.S. Cl.
   CPC .......... *B60R 16/037* (2013.01); *B60W 10/30* (2013.01); *B60W 40/08* (2013.01); *G06V 20/597* (2022.01);
   (Continued)

(58) Field of Classification Search
   None
   See application file for complete search history.

(56) References Cited

U.S. PATENT DOCUMENTS 11,086,317 B2 *   8/2021   Healey ............... G01C 21/3484
11,550,322 B1 *   1/2023   Christie ................. G05D 1/628
(Continued)

FOREIGN PATENT DOCUMENTS

| CN | 113060084 A | * | 7/2021 | |
| CN | 114418298 A | * | 4/2022 | ............ G01K 13/00 |
| DE | 102018207849 A1 | * | 11/2019 | |

OTHER PUBLICATIONS

Machine translation of Zhang et al. (CN-113060084-A) (Year: 2021).*

(Continued)

*Primary Examiner* — Todd Melton
*Assistant Examiner* — Sarah A. Mueller
(74) *Attorney, Agent, or Firm* — Vivacqua Crane, PLLC

(57) ABSTRACT

A method is provided for operating a vehicle having an interior control setting system with a computer. One or more occupant input devices generate an occupant input signal associated with sensor data, which indicates a total number of occupants, a classification, and a current emotion for each occupant disposed in the vehicle. One or more processors uses multiple occupant profiles, with each occupant profile mapped to a unique occupant identification and a plurality of actuated interior control settings, to determine an n-occupant emotion vector based on the total number of the occupants and the classification for each occupant. The processor maps the n-occupant emotion vector to interior control settings and determines a predicted interior control setting for the occupant. The processor generates an actuation signal associated with the predicted interior control setting, such that one or more actuators actuate a vehicle component based on the predicted interior control setting.

14 Claims, 2 Drawing Sheets

(51) Int. Cl.
*B60W 40/08* (2012.01)
*G06V 20/59* (2022.01)

(52) U.S. Cl.
CPC ..... *B60W 2540/22* (2013.01); *B60W 2555/00* (2020.02)

(56) References Cited

U.S. PATENT DOCUMENTS

| | | | |
|---|---|---|---|
| 11,679,728 B2* | 6/2023 | Islam | B60W 10/30 701/36 |
| 12,033,661 B2 | 7/2024 | Nimmagadda et al. | |
| 2017/0057507 A1* | 3/2017 | Gordon | B60W 30/16 |
| 2023/0202490 A1* | 6/2023 | Marzorati | B60W 50/0098 701/36 |

OTHER PUBLICATIONS

Machine translation of Birnthaler et al. (DE-102018207849-A1) (Year: 2019).*
Machine translation of Long et al. (CN-114418298-A) (Year: 2022).*

* cited by examiner

VEHICLE SYSTEM AND METHOD FOR ADJUSTING INTERIOR CONTROL SETTINGS BASED ON DRIVER EMOTION AND ENVIRONMENTAL CONTEXT

INTRODUCTION

The present disclosure relates to interior control systems for vehicles, and more particularly to an interior control setting system that actuates a vehicle component based on the emotion of each occupant positioned in the vehicle, the prioritized weight of each occupant, and the prioritized weight of an environmental context of the vehicle.

Modern vehicles include a Human Machine Interface (HMI) (e.g., a center dashboard touch screen) that can be manually operated by an occupant to adjust the settings of one or more interior vehicle systems. For example, the occupant may operate the touch screen display to access a menu with interior control settings for an automatic door lock system (based on vehicle speed, shifting from park, or the like), an automatic door unlock system (based on vehicle speed, shifting to park, or the like), key fob operation (e.g., press unlock once to unlock only the driver's door and twice to unlock all doors, or the like), automatic re-lock timer, lock/unlock feedback tone, automatic seat temperature, headlights automatic on sensitivity, headlights automatic shut-off timer, daytime running light activation, interior lights automatic shut-off timer, exterior lights automatic shut-off timer, and/or the like. While these vehicles permit an occupant to manually customize various vehicle control settings, these vehicles do not automatically adjust those settings based on any criteria or conditions.

Thus, while existing vehicle systems with control settings achieve their intended purpose, there is a need for a new and improved system and method that addresses these issues.

SUMMARY

According to several aspects of the present disclosure, a method is provided for operating a vehicle having an interior control setting system (ICS system) with a computer. The method includes collecting, using one or more occupant input devices, sensor data that indicates a total number of occupants, a classification, and a current emotion for each occupant disposed in the vehicle. The method further includes generating, using the occupant input device, an occupant input signal associated with the sensor data. The method further includes receiving, using one or more processors of the computer, the occupant input signal from the occupant input device. The method further includes determining, using the processor, an n-occupant emotion vector based on the total number of occupants and the classification for each of the occupants in response to the processor receiving the occupant input signal from the occupant input device. The method further includes mapping, using the processor and a plurality of occupant profiles stored in a non-transitory computer readable storage medium (CRM) of the computer, the n-occupant emotion vector to a plurality of interior control settings. Each occupant profile is mapped to a unique occupant identification and an associated plurality of actuated interior control settings. The method further includes determining, using the processor, a predicted interior control setting for the occupant in response to the processor mapping the n-occupant emotion vector to a plurality of interior control settings. The method further includes generating, using the processor, an actuation signal associated with the predicted interior control setting in response to the processor determining the predicted interior control setting. The method further includes actuating, using one or more actuators, a vehicle component based on the predicted interior control setting, in response to the actuator receiving the actuation signal from the processor.

In one aspect, the method further includes actuating, using a volume microcontroller, a speaker to adjust a volume of the speaker to a predetermined volume associated with the predicted interior control setting, in response to the volume microcontroller receiving the actuation signal.

In another aspect, the method further includes actuating, using a display microcontroller, a display device to adjust a brightness of the display device to a predetermined brightness level associated with the predicted interior control setting, in response to the display microcontroller receiving the actuation signal.

In another aspect, the method further includes actuating, using a motor, a damper to move to a fresh air position for directing fresh air into the interior of the passenger cabin or a recirculating position for returning recirculated air into the interior of the passenger cabin, in response to the motor receiving the actuation signal.

In another aspect, the method further includes actuating, using an LED microcontroller, a plurality of LEDs to emit a predetermined color associated with the predicted interior control setting, in response to the LED microcontroller receiving the actuation signal.

In another aspect, the method further includes assigning a prioritized weight to each of the occupant, with the weight being based on the classification of the associated occupant.

In another aspect, the method further includes collecting, using one or more environment input devices, sensor data that indicates a current environment of the vehicle. The method further includes generating, using the environment input device, an environment input signal associated with the sensor data. The method further includes receiving, using the processor, the environment input signal from the environment input device. The method further includes determining, using the processor, an environment context vector based on an environment of the vehicle in response to the processor receiving the environment input signal from the environment input device. The method further includes mapping, using the processor and the occupant profiles, the environment context vector to multiple interior control settings. The method further includes determining, using the processor, the predicted interior control setting for the occupant in further response to the processor mapping the environment context vector to the interior control settings.

In another aspect, the method further includes determining, using the processor, that the current environment is associated with a restricted driving condition included in one of the occupant profiles associated with one of the occupants and stored in the CRM. The restricted driving condition includes a predetermined time of day, a pair of predetermined geolocation coordinates, a hospital zone, a construction zone, a school zone, a residential area, a zone of religious worship, an inclement weather, and/or an emergency vehicle. The method further includes determining, using the processor, the predicted interior control setting further based on the restricted driving zone.

According to several aspects of the present disclosure, a computer is provided for an interior control setting system (ICS system) of a vehicle. The computer includes one or more processors electronically communicating with one or more occupant input devices. The computer further includes a non-transitory computer readable storage medium (CRM) storing a plurality of occupant profiles. Each occupant profile is mapped to a unique occupant identification and an associated plurality of actuated interior control settings. The CRM further stores instructions, such that the processor is programmed to receive an occupant input signal from the occupant input device. The occupant input signal is associated with sensor data that indicates a total number of occupants, a classification, and a current emotion for each occupant disposed in the vehicle. The processor is further programmed to determine an n-occupant emotion vector based on the total number of occupants and the classification for each occupant, in response to the processor receiving the occupant input signal from the occupant input device. The processor is further programmed to map the n-occupant emotion vector to multiple interior control settings. The processor is further programmed to determine a predicted interior control setting for the occupant, in response to the processor mapping the n-occupant emotion vector to multiple interior control settings. The processor is further programmed to generate an actuation signal associated with the predicted interior control setting, in response to the processor determining the predicted interior control setting. One or more actuators actuates one or more vehicle components based on the predicted interior control setting in response to the actuator receiving the actuation signal from the processor.

In one aspect, each classification has a prioritized weight, where the prioritized weight associated with each classification is different from one another.

In another aspect, the processor is further programmed to receive an environment input signal from one or more environment input devices. The environment input signal is associated with sensor data that indicates a current environment of the vehicle. The processor is further programmed to determine an environment context vector based on the current environment, in response to the processor receiving the environment input signal from the environment input device. The processor is further programmed to map the environment context vector to multiple interior control settings. The processor is further programmed to determine the predicted interior control setting for the occupant, in further response to the processor mapping the environment context vector to a plurality of interior control settings.

In another aspect, the environment signal indicates that the current environment is associated with a restricted driving condition. The restricted driving condition includes a predetermined time of day, a pair of predetermined geo-location coordinates, a hospital zone, a construction zone, a school zone, a residential area, a zone of religious worship, an inclement weather, and/or an emergency vehicle. The processor is further programmed to determine the predicted interior control setting further based on the restricted driving zone.

According to several aspects of the present disclosure, an interior control setting system (ICS system) is provided for a vehicle having a passenger cabin with an interior. The ICS system includes one or more occupant input devices for collecting sensor data, which indicates a total number of occupants, a classification, and a current emotion for each occupant disposed in the vehicle. The occupant input device generates an occupant input signal associated with the sensor data. The ICS system further includes a computer attached to the vehicle, with the computer having one or more processors electronically communicating with the occupant input device. The computer further includes a non-transitory computer readable storage medium (CRM) storing a plurality of occupant profiles. Each occupant profile is mapped to a unique occupant identification and an associated plurality of actuated interior control settings. The CRM further stores instructions, such that the processor is programmed to receive the occupant input signal from the occupant input device. The processor is further programmed to determine an n-occupant emotion vector based on the total number of occupants and the classification for each of the occupants, in response to the processor receiving the occupant input signal from the occupant input device. The processor is further programmed to map the n-occupant emotion vector to a plurality of interior control settings. The processor is further programmed to determine a predicted interior control setting for the occupant, in response to the processor mapping the n-occupant emotion vector to multiple interior control settings. The processor is further programmed to generate an actuation signal associated with the predicted interior control setting, in response to the processor determining the predicted interior control setting. The vehicle further includes one or more actuators electronically communicating with the processor and one or more vehicle components. The actuator actuates the vehicle component based on the predicted interior control setting, in response to the actuator receiving the actuation signal from the processor.

In one aspect, the actuators include a volume microcontroller, and the vehicle components include a speaker. The volume microcontroller adjusts a volume of the speaker to a predetermined volume associated with the predicted interior control setting, in response to the volume microcontroller receiving the actuation signal.

In another aspect, the actuators further include a display microcontroller, and the vehicle components further include a display device. The display microcontroller adjusts a brightness of the display device to a predetermined brightness level associated with the predicted interior control setting, in response to the display microcontroller receiving the actuation signal.

In another aspect, the actuators further include a motor, and the vehicle components further include a damper. The motor moves the damper to afresh air position for directing fresh air into the interior of the passenger cabin or a recirculating position for returning recirculated air into the interior of the passenger cabin in response to the motor receiving the actuation signal.

In another aspect, the actuator further includes an LED microcontroller, and the vehicle components further include a plurality of LEDs for emitting a plurality of colors. The LED microcontroller actuates at least a portion of the LEDs to emit a predetermined color associated with the predicted interior control setting, in response to the LED microcontroller receiving the actuation signal.

In another aspect, each classification has a prioritized weight, where the prioritized weight associated with each classification is different from one another.

In another aspect, the ICS system further includes one or more environment input devices for collecting sensor data that indicates a current environment of the vehicle. The environment input device generate an environment input signal associated with the sensor data. The processor electronically communicates with the environment input device and is further programmed to receive the environment input signal from the environment input device. The processor is further programmed to determine an environment context vector based on an environment of the vehicle, in response to the processor receiving the environment input signal from the environment input device. The processor is further programmed to map the environment context vector to a plurality of interior control settings. The processor is further programmed to determine the predicted interior control setting for the occupant, in further response to the processor mapping the environment context vector to the interior control settings.

In another aspect, the environment signal indicates that the current environment is associated with a restricted driving condition. The restricted driving condition includes a predetermined time of day, a pair of predetermined geo-location coordinates, a hospital zone, a construction zone, a school zone, a residential area, a zone of religious worship, an inclement weather, and/or an emergency vehicle. The processor is further programmed to determine the predicted interior control setting further based on the restricted driving zone.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

The present disclosure describes one example of a vehicle 100 having an interior control setting system 102 (ICS system) with a computer 104, which automatically predicts a desired setting for an ICS system 102 based on a total number of occupants or occupants positioned in the vehicle and an emotion of each occupant. The ICS system 102 adjusts a setting for an actuator of a vehicle interior system based on a predicted interior control setting, and the ICS system 102 monitors the emotion of the occupants to determine feedback on predicted interior control setting. Non-limiting examples of the vehicle 100 (e.g., a sedan, a light duty truck, a heavy duty truck, a sport utility vehicle, a van, a motor home, a passenger bus, a commercial truck, a waste collection vehicle, a utility vehicle, a delivery vehicle, an emergency vehicle, etc.) may include vehicles ranging between Levels zero and five of driving automation, with an associated propulsion system (e.g., an electric motor and/or an internal combustion engine, hydrogen fuel cells, etc.). The ICS system 102 automatically adjusts the settings of one or more vehicle interior systems when, for example, the occupants in the vehicle may be distracted from operating those vehicle interior systems because those occupants are experiencing emotions prior to or while operating the vehicle.

Figure 1:
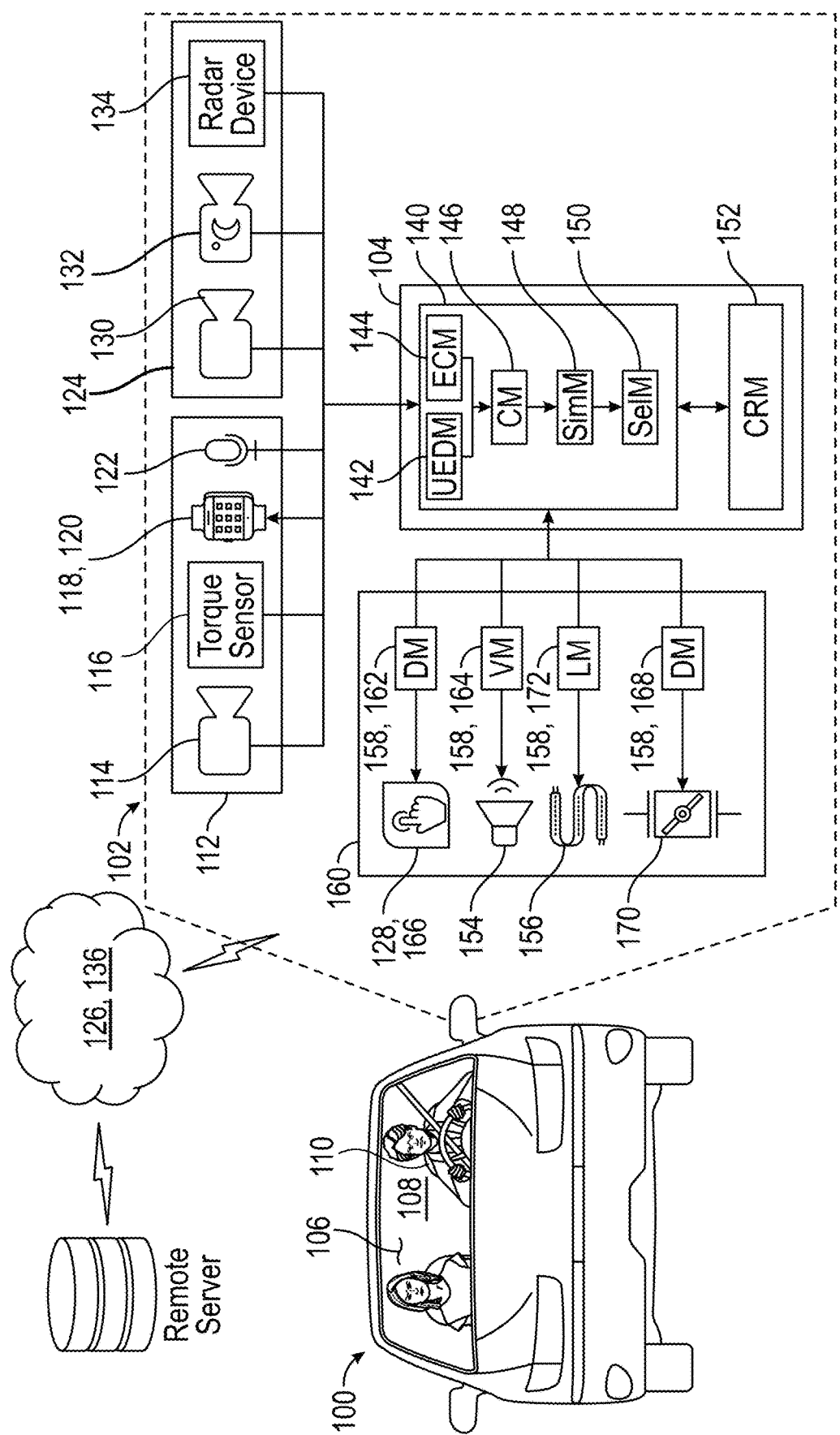
FIG. 1 is a schematic view of one example of a vehicle having an Advanced Driver Assistance System (ADAS) including a computer for recommending actuation of the ADAS based on driver behavior and emotion.

Referring to FIG. 1, one non-limiting example of the vehicle 100 includes a passenger cabin 106 defining an interior 108 and a plurality of seats 110 positioned within the interior 108 of the passenger cabin 106. The seats 110 are configured to support one or more users or occupants of the vehicle 100.

The ICS system 102 includes one or more occupant input devices 112 for collecting sensor data that indicates a total number of occupants positioned in the vehicle and/or a classification and a current emotion of each occupant. The occupant input device 112 generates an occupant input signal associated with the sensor data. The occupant input devices 112 may be part of a Driver Monitoring System (DMS) that monitors facial expressions, body movement, and/or other behavior of each one of the occupants, which indicate an emotion of the associated occupants (e.g., happy, sad, neutral, angry, etc.). One non-limiting example of the occupant input device 112 may include an occupant-facing camera 114 attached to the vehicle 100, with the occupant-facing camera 114 generating the input signals in response to the occupant-facing camera 114 capturing an appearance of each of the associated occupants. Another non-limiting example of the occupant input device 112 may include a torque sensor 116 attached to a steering wheel of the vehicle 100, with the torque sensor 116 measuring a torque that the occupant applies to the steering wheel. Yet another non-limiting example of the occupant input device 112 may include a wearable device 118 (e.g., a smartwatch, a chest strap, etc.) carried by the occupant, with the wearable device 118 having an Impulse Radio Ultra-Wide Band radar component 120 (IR-UWB radar component) generating the input signal in response to the IR-UWB radar component 120 measuring a pulse rate, a blood oxygen, a respiratory rate, a blood pressure, and/or a temperature of the occupant. Yet another non-limiting example of the occupant input device 112 may include a microphone 122 attached to the vehicle 100, with the microphone 122 generating the input signal in response to the microphone 122 capturing one or more words spoken by the occupant, a volume of a voice of the occupant, and a tone of the voice. The input devices may be biometric sensors, pressure sensors in the seats for detecting the number of occupants, or other suitable input devices for collecting sensor data indicating the current emotion of the occupant.

The ICS system 102 further includes one or more environment input devices 124 for collecting sensor data that indicates a current environment of the vehicle 100. In one non-limiting example, one or more environment input devices 124 indicates that a current environment of the vehicle 100 is associated with a restricted driving condition, which is indicated or associated with one of the occupant profiles and stored in the CRM. In one non-limiting example, the environment input device 124 includes a GPS network 126 indicating the restricted driving condition based on a predetermined time of day (e.g., high-traffic hours between 8:00 am and 6:00 pm), a pair of predetermined geolocation coordinates (e.g., a location manually entered into the ICS system 102 by the occupant operating a Human Machine Interface 128 (HMI) via a center console dashboard touchscreen display, an instrument panel display, steering wheel-mounted controls, and/or the like), a hospital zone, a construction zone, a school zone, a residential area, a zone of religious worship, an inclement weather, an emergency vehicle, and/or the like. The environment input devices 124 generate an environment input signal associated with the sensor data.

One non-limiting example of these environment input devices 124 may include an externally-facing camera 130 attached to the vehicle 100, with the externally-facing camera 130 detecting and classifying objects (e.g., emergency vehicles, a densely populated residential area, a school zone traffic sign, a hospital traffic sign, a railroad crossing traffic sign, etc.). Another non-limiting example of these environment input devices 124 may include a night-vision camera 132 for detecting objects in poor visibility and/or a radar device 134 for detecting cross-traffic. Other non-limiting examples of environment input devices 124 may include on-board sensors (e.g., a lidar device, an ultra-sound device, an infrared camera, an ultrasonic device, a steering wheel angle sensor, a brake sensor, a wheel speed sensor, etc.). Still another non-limiting example of these environment input devices 124 may include off-board devices in a data and communication network 136 (e.g., a cloud/V2X-based sensor, a cellular network, a Dedicated Short-Range Communications (DSRC) network, a Vehicle-To-Infrastructure (V2X) network, a Global Positioning Satellite (GPS) network 126, a Wi-Fi network, a road traffic monitoring network, a road database, an Internet network, etc.). It contemplated that the input device may be a multi-modal input system.

The ICS system 102 further includes a computer 104 attached to the vehicle 100, with the computer 104 having one or more processors 140 electronically communicating with the occupant input devices 112, the environment input devices 124, and the HMI 128. As described in more detail below, the processors 140 include an n-occupant emotion detection module 142, an environment context module 144, a combiner module 146, a similarity module 148, and a selection module 150. It is to be appreciated that although the one or more processors 140 are illustrated as on-board the vehicle 100, other processing mechanisms such as edge-based processing or cloud processing may be used as well.

The computer 104 further includes a non-transitory computer readable storage medium 152 (CRM) storing a plurality of occupant profiles, with each of the occupant profiles mapped to a unique occupant identification and an associated plurality of actuated interior control settings. The CRM 152 further stores instructions, such that the processor is programmed to receive the occupant input signal from the occupant input devices 112.

The emotion detection module 142 determines the emotion vectors of individual occupants based on one or more machine learning techniques, in response to the processor 140 receiving the input signals. In one example, the machine learning technique is either a Gaussian mixture model (GMM) or, in the alternative, a combined Gaussian mixture model and Deep Neural Network (GMM-DNN). A Gaussian mixture model equation is expressed in Equation 1 below, where a unique Gaussian mixture model is trained for each emotional state of the occupant.

Equation 1 includes emotional classes K that each signify an emotional state of the occupant (e.g., K={angry, happy, sad, neutral}) and classifiers C, which represent different sensor modalities. The different sensor modalities refer to the different occupant input devices 112 (e.g., C={DMS camera, IR-UWB radar system, seat pressure sensor, steering wheel torque sensor}), where Equation 1 solves for a combined emotional vector that is determined based on the different classifiers or sensor modalities. In other words, the emotion vectors determined by the Gaussian mixture model are a combined emotional vector that is determined based on the different sensor modalities available onboard the vehicle 100.

The emotion detection module 142 receives the sensor data captured during a specific time window such as, for example, about sixty seconds. The term x in Equation 1 below represents an observation during the specific time window, and the observation x constitute sensor inputs captured during a specific time window, where each observation x is expressed as $x=\{x_1, x_2, \ldots x_n\}$, and where $x_i$ is a subset of features of x used by classifier output $\lambda_i$=i=1, 2, ..., C. For each observation x, a class label $\omega$ exists belonging to one of the emotional classes K. Equation 1 is expressed as:

$$P(\omega|x) = \sum_{i=1}^{C}\sum_{k=1}^{K} P(\omega|\widetilde{\omega}_k, \lambda_i) P(\widetilde{\omega}_k|\lambda_i, x) P(\lambda_i|x) \quad \text{Eqn. 1}$$

where $P(\omega|x)$ represents the emotion vectors, $P(\widetilde{\omega}_k|\lambda_i, x)$ is the prediction of the classifier output $\lambda_i$, $P(\omega|\widetilde{\omega}_k, \lambda_i)$ is the probability for a given class label $\omega$ given that classifier output $\lambda_i$ is assigned a specific label (e.g., $\omega_k$=happy), and $P(\lambda_i|x)$ is the probability of classifier output $\lambda_i$ for a given observation window x. The emotion vectors are determined by solving for Equation 1, where the emotional vectors represent a specific emotional state of the occupant as determined based on multiple sensor modalities.

In one example, the classifier output $\lambda_1$ represents the output from the DMS camera, and x: $\omega_1$=[0.05, 0.72, 0.01, 0.22], which indicates the emotional state is highly likely to be happy. The classifier output $\lambda_2$ represents the output from the IR-UWB radar system, and x: $\omega_2$=[0.1, 0.6, 0.08, 0.31]. In the present example, the combined emotional vector of both classifier outputs $\lambda_1$, $\lambda_2$ are expressed as $P(\omega|x)$=[0.06, 0.7, 0.04, 0.2].

In another example, the emotion detection module 142 determines the emotion vector based on the combined Gaussian Mixture Model and Deep Neural Network (GMM-DNN). In this embodiment, the emotion detection module 142 determines the emotion vector using the GMM described above, which is then supplied to a DNN. The DNN also receives the sensor data as input and determines the emotion vector based on the input. In embodiments, the DNN is a convolutional neural network (CNN).

The processor 140 is further programmed to construct or determine, based on one or more machine learning techniques, an n-occupant emotion vector based on the total number of the occupants and the classification of each occupant, in response to the processor 140 receiving the occupant input signal from the occupant input devices, according to Equations 2 and 3:

$$O = \Sigma_{i=0}^{n} w_i * O_i$$

where $O_i$ represents an individual emotion vector for the associated occupant (i); O represents the n-occupant emotion vector for all the occupants (n) disposed in the vehicle; m represents a number of emotional states, $w_i$ represents the weight for the classification of the associated occupant. The n-occupant emotion vector numerically represent the current emotion of the occupants based on the sensor data associated with the input signals. In one example, the processor 140 may construct the emotion vector pursuant to the method and system disclosed in U.S. patent application Ser. No. 17/747,186, which is incorporated herein by its entirety. Each classification has a prioritized weight, and the prioritized weight for each classification is different from one another. In one non-limiting example, the prioritized weight of an occupant who is a driver of a Level zero vehicle may have a prioritized weight that is higher than a prioritized weight of another occupant who is a passenger positioned in a rear seat. However, in other non-limiting examples, the weight of every occupant may be equal to one another.

The processor 140 is further programmed to map the n-occupant emotion vector to a plurality of interior control settings, according to Equation 4:

$$ICS_{em} = F_{em}(O) \qquad \text{Eqn. 4}$$

where $F_{em}(O)$ represents a mapping function of the n-occupant emotion vector; and $ICS_{em}$ represents the mapping of the n-occupant emotion vector to multiple interior control settings. In one non-limiting example, $F_{em}$, the processor 140 maps a first value for happy and/or neutral emotions to volume levels below a volume threshold and further to brightness levels above a brightness threshold. In another non-limiting example, $F_{em}$, the processor 140 maps a second value for sad or angry emotions to brightness levels below the brightness threshold, with the first value being higher than the second value.

The processor 140 is further programmed to determine a predicted interior control setting for the occupants, in response to the processor mapping the n-occupant emotion vector to a plurality of interior control settings.

The processor 140 is further programmed to prioritize environmental context information in relation to the interior control setting ($ICS_{env}$). The processor 140 is further programmed to determine an environment context vector based on an environment of the vehicle 100, in response to the processor 140 receiving the environment input signal from the environment input devices 124, according to Equation 5:

$$EC_p = [\{ctxt\_type\_1 : pri\_val\}, \ldots \{ctxt\_type\_n : v_n\}] \qquad \text{Eqn. 5}$$

where $EC_p$ represents the environment context vector; ctxt_type_1:pri_val represents a numerical value of a first environment context having a first prioritized value; and ctxt_type_n:pri_val represents a numerical value of the nth environment context having an nth prioritized value.

In one non-limiting example, the prioritized value is associated with each environment context. Where an occupant has a classification indicating an SpO2 level, which is below a predetermined SpO2 threshold, and the environment input signal is associated with sensor data indicating an air quality below an air quality threshold, the processor 140 assigns a prioritized value to the environment context that is higher than a prioritized value associated another environment context.

The processor 140 is further programmed to map the environment context vector to a plurality of interior control settings according to Equation 6:

$$ICS_{env} = F_{env}(EC_p) \qquad \text{Eqn. 6}$$

where $F_{env}(EC_p)$ represents a mapping function of the environment context vector; and $ICS_{env}$ represents the mapping of the environment vector to multiple interior control settings. In one non-limiting example, $F_{env}$, the processor 140 determines an air quality index associated with a numerical value that is above an acceptable threshold T, for operating a toggle air recirculation button. In another non-limiting example, $F_{env}$, the processor 140 determines an audio volume level when the vehicle 100 is near a restricted zone (e.g., a hospital zone, a school zone, etc.), for increasing an alert volume level of a speaker 154. In still another non-limiting example, $F_{env}$, the processor 140 determines a brightness level for an ambient light (e.g., the LEDs 156, etc.) when the time is between 8:00 am and 6:00 pm. The CRM 152 may store any suitable interior control settings associated with any environment context.

The processor 140 (e.g., the combiner module 146) is further programmed to determine overall ICS mapping by combining the ICS mapping for the n-occupant emotion vector, the ICS mapping for the environment context vector, and an ICS mapping for an historical actuated interior control setting, according to Equation 7:

$$ICS = ICS_{em} \oplus ICS_{env} \oplus ICS_h \qquad \text{Eqn. 7}$$

where ICS represents the interior control settings based on the n-occupant emotion vector, the environment context vector, and the historical interior control setting; $ICS_{em}$ represents the interior control settings based on the n-occupant emotion vector; $ICS_{env}$ represents the interior control settings based on the environment context vector; and $ICS_h$ represents the interior control settings based on the historical actuated interior control setting.

The processor 140 is further programmed to determine the predicted interior control setting for the occupants, in further response to the processor 140 mapping the n-occupant emotion context vector, the environment context vector, and the historical interior control setting and combining the associated ICS mappings. The processor 140 is further programmed to generate an actuation signal associated with the predicted interior control setting, in response to the processor 140 determining the predicted interior control setting.

The ICS system 102 further includes one or more actuators 158 electronically communicating with the processor and one or more vehicle components 160. The actuators 158 actuate the associated vehicle components 160 based on the predicted interior control setting, in response to the actuators 158 receiving the actuation signal from the processor 140. In this non-limiting example, the actuators 158 include a volume microcontroller 164, and the vehicle components 160 include a speaker 154. The volume microcontroller 164 adjusts a volume of the speaker 154 to a predetermined volume associated with the predicted interior control setting, in response to the volume microcontroller 164 receiving the actuation signal. The actuators 158 further include a display microcontroller 162, and the vehicle components 160 further include a display device 166. The display microcontroller 162 adjusts a brightness of the display device 166 to a predetermined brightness level associated with the predicted interior control setting, in response to the display microcontroller 162 receiving the actuation signal. The actuators 158 further include a motor 168, and the vehicle components 160 further include a damper 170. The motor 168 moves the damper 170 to a fresh air position for directing fresh air into the interior 108 of the passenger cabin 106 and/or a recirculating position for returning recirculated air into the interior 108 of the passenger cabin 106 in response to the motor 168 receiving the actuation signal. The actuators 158 further include an LED microcontroller 172, and the vehicle components 160 further include a plurality of LEDs 156 for emitting a plurality of colors. The LED microcontroller 172 actuates at least a portion of the LEDs 156 to emit a predetermined color associated with the predicted interior control setting in response to the LED microcontroller 172 receiving the actuation signal.

The processor 140 is further programmed to continuously monitor and learn from occupant feedback on the predicted interior setting that has been applied to the actuator 158. The processor 140 monitors and learns from the feedback via in-vehicle, edge/cloud, or a hybrid of in-vehicle and edge/cloud techniques according to Equation 8:

$$M_t = [O_v, ICS_{t-1}] \qquad \text{Eqn. 8}$$

where $M_t$ represents a monitoring (M) component map; $ICS_{t-1}$ represents the actuated ICS at time t−1; and $O_v$ represents the n-occupant emotion vector. In one non-limiting example, the monitoring time interval may be a fixed value (e.g., every 30 minutes, etc.). In other examples, the monitoring time interval may be a variable value (e.g., context dependent). The processor 140 may use the monitored values and machine learning and artificial intelligence techniques to learn an intelligent customized module.

The processor 140 may be further programmed to use a Deep Neural Network (DNN) based Multi-Output Regression Model learn the intelligent customized module. A pre-trained interior control setting customization model may be based on historical data or manually entered occupant preferences that are deployed in the vehicle, edge/cloud. The customization model may be continually updated (via retraining in the cloud or edge device) based on an occupant response to or feedback on the predicted interior control setting that has been applied to the vehicle system.

Figure 2:
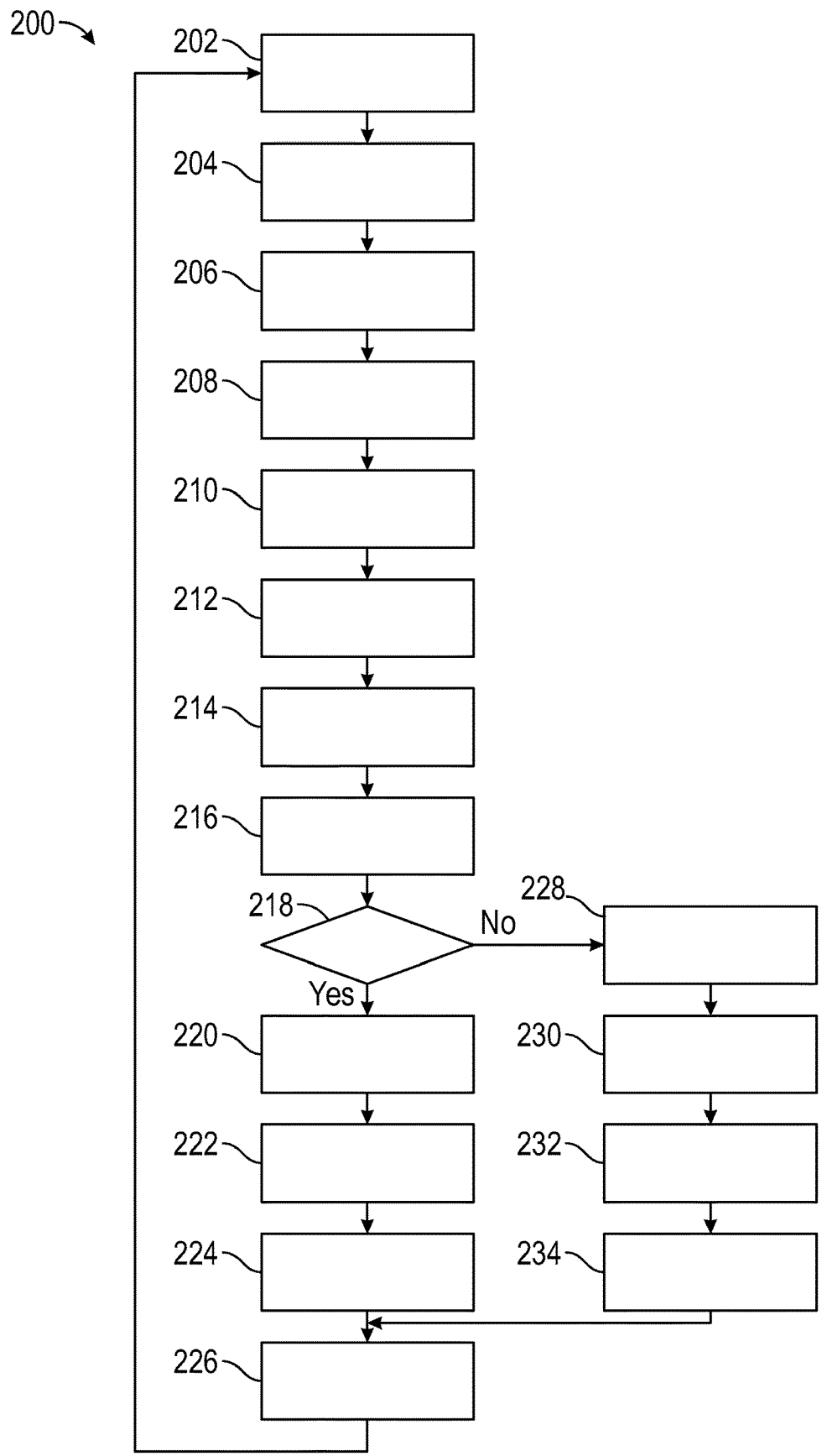
FIG. 2 is a flow chart of one example of a method of operating the computer of FIG. 1.

Referring to FIG. 2, one exemplary method 200 is provided for operating the vehicle 100 of FIG. 1. The method 200 begins at block 202 with collecting, using one or more of the occupant input devices 112, sensor data that indicates the total number, the classification, and the current emotion for each occupant disposed in the vehicle 100. The method 200 further includes generating, using the occupant input devices, the occupant input signal associated with the sensor data. The method 200 then proceeds to block 204.

At block 204, the method 200 further includes receiving, using the processor 140 of the computer 104, the occupant input signal from the occupant input devices 112. The method 200 then proceeds to block 206.

At block 206, the method 200 further includes determining, using the processor 140, the n-occupant emotion vector based on the total number of the at least one occupant and the classification for each of the at least one occupant in response to the processor receiving the occupant input signal from the at least one occupant input device. The method 200 then proceeds to block 208.

At block 208, the method 200 further includes assigning, using the processor 140, a prioritized weight to each occupant, with the weight being based on the classification of the associated occupant. The method 200 then proceeds to block 210.

At block 210, the method 200 further includes mapping, using the processor 140 and the plurality of occupant profiles stored in the CRM 152, the n-occupant emotion vector to a plurality of interior control settings, with each occupant profile being mapped to a unique occupant identification and an associated plurality of actuated interior control settings. The method 200 then proceeds to block 212.

At block 212, the method 200 further includes collecting, using one or more of the environment input devices 124, sensor data that indicates a current environment of the vehicle. The method 200 further includes generating, using the environment input devices 124, the environment input signal associated with the sensor data. The method 200 then proceeds to block 214.

At block 214, the method 200 further includes receiving, using the processor 140, the environment input signal from the environment input devices 124. The method 200 then proceeds to block 216.

At block 216, the method 200 further includes determining, using the processor, the environment context vector based on the environment of the vehicle 100 in response to the processor 140 receiving the environment input signal from the environment input devices 124. The method 200 then proceeds to block 218.

At block 218, in this non-limiting example, the method 200 further includes determining, using the processor 140, whether the current environment is associated with a restricted driving condition included in one of the occupant profiles associated with one of the occupants and stored in the CRM 152, and based on the environment input signal. The restricted driving condition may include predetermined time of day (e.g., high-traffic hours between 8:00 am and 6:00 pm), a pair of predetermined geolocation coordinates (e.g., a location manually entered into the ICS system 102 by the occupant operating a Human Machine Interface 128 (HMI) via a center console dashboard touchscreen display, an instrument panel display, steering wheel-mounted controls, and/or the like), a hospital zone, a construction zone, a school zone, a residential area, a zone of religious worship, an inclement weather, an emergency vehicle, and/or the like. If the processor 140 determines that the current environment is associated with one of the restricted driving conditions, the method 200 proceeds to block 220. If the processor 140 determines that the current environment is not associated with any of the restricted driving conditions, the method 200 proceeds to block 228.

At block 220, the method 200 further includes mapping, using the processor 140, a restricted interior control setting to the environment in response to the processor 140 determining that the environment is associated with any one or more of the restricted driving conditions. In one non-limiting example, where the processor 140 determines, at block 218, that the vehicle is being driven at a time between 8:00 am and 6:00 pm, the processor 140 assigns the interior control setting for ambient LEDS 156 to a brightness level that is below the brightness threshold. In another non-limiting example, where the processor 140 determines, at block 218, that the air quality index surrounding the vehicle 100 is above a predetermined air quality index threshold, the processor 140 assigns the interior control setting of a damper 170 to an air recirculation mode. In yet another non-limiting example, where the processor 140 determines, at block 218, that the vehicle 100 is positioned within a hospital zone or a school zone, the processor 140 assigns the interior control setting of a speaker 154 for an infotainment system to a predetermined volume level that is below the volume threshold. Put another way, the method 200 includes determining, using the processor 140, the predicted interior control setting further based on the restricted driving zone. The method 200 then proceeds to block 222.

At block 222, the method 200 further includes generating, using the processor 140, the actuation signal associated with the restricted interior control setting in response to the processor 140 determining the restricted interior control setting. The method 200 then proceeds to block 224.

At block 224, the method 200 further includes actuating, using the actuator 158, the vehicle component 160 in response to the actuator 158 receiving the actuation signal from the processor 140. In one non-limiting example, where the processor 140 determines, at block 218, that the vehicle is being driven at a time between 8:00 am and 6:00 pm, the processor 140 assigns the interior control setting for ambient LEDS 156 to a brightness level that is below the brightness threshold. In another non-limiting example, where the processor 140 determines, at block 218, that the air quality index surrounding the vehicle 100 is above a predetermined air quality index threshold, the processor 140 assigns the interior control setting of a damper 170 to an air recirculation mode. In yet another non-limiting example, where the processor 140 determines, at block 218, that the vehicle 100 is positioned within a hospital zone or a school zone, the processor 140 assigns the interior control setting of a speaker 154 for an infotainment system to a predetermined volume level that is below the volume threshold. The method 200 then proceeds to block 226.

At block 226, the method 200 further includes monitoring and learning occupant feedback on the actuated interior control setting. The processor 140 uses artificial intelligence and machine learning techniques to learn an intelligent customization module based on the monitored values. The method 200 returns to block 202.

At block 228, the method 200 further includes mapping, using the processor and the plurality of occupant profiles, the environment context vector to a plurality of interior control settings. The method 200 then proceeds to block 228.

At block 230, the method 200 further includes determining, using the processor 140, the predicted interior control setting for the occupants in response to the processor mapping the n-occupant emotion vector to the interior control settings and in further response to the processor 140 mapping the environment context vector to the interior control settings. The method 200 then proceeds to block 232.

At block 232, the method 200 further includes generating, using the processor 140, the actuation signal associated with the predicted interior control setting in response to the processor determining the predicted interior control setting. The method 200 then proceeds to block 234.

At block 234, the method 200 further includes actuating, using one or more of the actuators 158, one or more of the vehicle components 160, in response to the actuator 158 receiving the actuation signal from the processor 140. In one non-limiting example, the method 200 includes actuating, using the volume microcontroller 162, the speaker 154 to adjust the volume of the speaker 154 to the predetermined volume associated with the predicted interior control setting in response to the volume microcontroller 162 receiving the actuation signal. In another non-limiting example, the method 200 further includes actuating, using the display microcontroller 164, the display device 166 to adjust the brightness of the display device 166 to the predetermined brightness level associated with the predicted interior control setting in response to the display microcontroller 164 receiving the actuation signal. In yet another non-limiting example, the method 200 further includes actuating, using the motor 168, the damper 170 to move to the fresh air position for directing fresh air into the interior 108 of the passenger cabin 106 or the recirculating position for returning recirculated air into the interior 108 of the passenger cabin 106 in response to the motor 168 receiving the actuation signal. In still another non-limiting example, the method 200 further includes actuating, using the LED microcontroller 172, the LEDs 156 to emit a predetermined color associated with the predicted interior control setting in response to the LED microcontroller 172 receiving the actuation signal. It is contemplated that the method may include other actuators actuating any suitable vehicle component. The method 200 then proceeds to block 226.

Computers and computing devices generally include computer executable instructions, where the instructions may be executable by one or more computing devices such as those listed above. Computer executable instructions may be compiled or interpreted from computer programs created using a variety of programming languages and/or technologies, including, without limitation, and either alone or in combination, JAVA, C, C++, MATLAB, SIMULINK, STATEFLOW, VISUAL BASIC, JAVA SCRIPT, PERL, HTML, TENSORFLOW, PYTORCH, KERAS, etc. Some of these applications may be compiled and executed on a virtual machine, such as the JAVA VIRTUAL MACHINE, the DALVIK virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

The processor may be communicatively coupled to, e.g., via the vehicle communications module, more than one local processor, e.g., included in electronic processor units (ECUs) or the like included in the vehicle 100 for monitoring and/or controlling various vehicle components. The processor 140 is generally arranged for communications on the vehicle communications module via an internal wired and/or wireless network, e.g., a bus or the like in the vehicle 100, such as a controller area network (CAN) or the like, and/or other wired and/or wireless mechanisms. Via the vehicle communications module, the processor 140 may transmit messages to various devices in the vehicle 100 and/or receive messages from the various devices, e.g., vehicle sensors, actuators, vehicle components, a Human Machine Interface (HMI), etc. Alternatively or additionally, in cases where the processor includes a plurality of devices, the vehicle communications network may be used for communications between devices represented as the computer in this disclosure. Further, various processors and/or vehicle sensors may provide data to the computer. The processor can receive and analyze data from sensors substantially continuously and/or periodically. Further, object classification or identification techniques can be used, e.g., in a processor based on lidar sensor, camera sensor, etc., data, to identify the lane markings, a type of object, e.g., vehicle, person, rock, pothole, bicycle, motorcycle, etc., as well as physical features of objects.

Memory may include a computer readable medium (also referred to as a processor readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above and are accessed via a network in any one or more of a variety of manners. A file system may be accessible from a computer operating system and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of operating a vehicle having an interior control setting system with a computer, the vehicle further having a passenger cabin with an interior, the method comprising:

collecting, using at least one occupant input device, sensor data that indicates a total number, a classification, and a current emotion for each of the at least one occupant disposed in the vehicle;

generating, using the at least one occupant input device, an occupant input signal associated with the sensor data;

receiving, using at least one processor of the computer, the occupant input signal from the at least one occupant device;

determining, using the at least one processor, an n-occupant emotion vector based on the total number of the at least one occupant and the classification for each of the at least one occupant in response to the at least one processor receiving the occupant input signal from the at least one occupant device, wherein the n-occupant emotion vector is defined as:

$$O_i=[\{happy: v1\},\{sad: v2\}, \ldots \{angry: v_n\}]$$

$$O=\Sigma_{i=0}^{n} w_i * O_i$$

where $O_i$ represents an individual emotion vector for the associated occupant (i), O represents the n-occupant emotion vector for all the occupants (n) disposed on the vehicle, m represents a number of emotional states, and $w_i$ represents the weight for the classification of the associated occupant;

mapping, using the at least one processor and a plurality of occupant profiles stored in a non-transitory computer readable storage medium (CRM) of the computer, the n-occupant emotion vector to a plurality of interior control settings, with each of the occupant profiles mapped to a unique occupant identification and an associated plurality of actuated interior control settings;

determining, using the at least one processor, a predicted interior control setting for the at least one occupant in response to the at least one processor mapping the n-occupant emotion vector to a plurality of interior control settings;

collecting, using at least one environment input device, sensor data that indicates a current environment of the vehicle;

generating, using the at least one environment input device, an environment input signal associated with the sensor data;

receiving, using the at least one processor the environment input signal from the environment input device;

determining, using the at least one processor, an environment context vector based on an environment of the vehicle in response to the at least one processor receiving the environment input signal from the at least one environment input device, wherein the environment context vector is defined as:

$$EC_x=[\{ctxt\_type\ 1:pri\_val\}, \ldots \{ctxt\_type\_x:v_x\}]$$

where $EC_x$, represents the environment context vector; ctxt_type_1:pri_val represents a numerical value of a first environment context having a first prioritized value, and ctxt_type_x:pri_val represents a numerical value of the xth environment context having a prioritized value;

mapping, using the at least one processor, the environment context vector to a plurality of interior control settings;

determining, using the at least one processor, the predicted interior control setting for the at least one occupant in further response to the at least one processor mapping the environment context vector to the plurality of interior control settings;

generating, using the at least one processor, an actuation signal associated with the predicted interior control setting in response to the at least one processor determining the predicted interior control setting; and actuating, using at least one actuator, at least one vehicle component based on the predicted interior control setting, in response to the at least one actuator receiving the actuation signal from the at least one processor.

2. The method of claim 1 further comprising actuating, using a volume microcontroller, a speaker to adjust a volume of the speaker to a predetermined volume associated with the predicted interior control setting in response to the volume microcontroller receiving the actuation signal.

3. The method of claim 2 further comprising actuating, using a display microcontroller, a display device to adjust a brightness of the display device to a predetermined brightness level associated with the predicted interior control setting in response to the display microcontroller receiving the actuation signal.

4. The method of claim 3 further comprising actuating, using a motor, a damper to move to one of a fresh air position for directing fresh air into the interior of the passenger cabin and a recirculating position for returning recirculated air into the interior of the passenger cabin in response to the motor receiving the actuation signal.

5. The method of claim 4 further comprising actuating, using an LED microcontroller, a plurality of LEDs to emit a predetermined color associated with the predicted interior control setting in response to the LED microcontroller receiving the actuation signal.

6. The method of claim 5 further comprising assigning a prioritized weight to each of the at least one occupant, with the weight being based on the classification of the associated occupant.

7. The method of claim 1 further comprising:
determining, using the at least one processor, that the current environment is associated with a restricted driving condition included in one of the occupant profiles associated with one of the occupants and stored in the CRM, where the restricted driving condition includes at least one of a predetermined time of day, a pair of predetermined geolocation coordinates, a hospital zone, a construction zone, a school zone, a residential area, and a zone of religious worship, an inclement weather, and an emergency vehicle; and
determining, using the at least one processor, the predicted interior control setting further based on the restricted driving zone.

8. An interior control setting system for a vehicle having a passenger cabin with an interior, the interior control setting system comprising:
at least one occupant input device for collecting sensor data that indicates a total number, a classification, and a current emotion for each of the at least one occupant disposed in the vehicle, and the at least one occupant input device generating an occupant input signal associated with the sensor data;
at least one environment input device for collecting sensor data that indicates a current environment of the vehicle and generating an environment input signal associated with the sensor data;
a computer attached to the vehicle, with the computer comprising:
at least one processor electronically communicating with the at least one occupant input device and the at least one environment input device; and
a non-transitory computer readable storage medium (CRM) storing a plurality of occupant profiles, with each of the occupant profiles mapped to a unique occupant identification and an associated plurality of actuated interior control settings, and the CRM further storing instructions such that the at least one processor is programmed to:
receive the occupant input signal from the at least one occupant input device;
determine an n-occupant emotion vector based on the total number of the at least one occupant and the classification for each of the at least one occupant in response to the at least one processor receiving the occupant input signal from the at least one occupant device,
wherein the n-occupant emotion vector is defined as:

$$O_i=[\{happy: v1\},\{sad: v2\}, \ldots \{angry: v_m\}]$$

$$O=\Sigma_{i=0}^{n}w_i*O_i$$

where $O_i$ represents an individual emotion vector for the associated occupant (i), O represents the n-occupant emotion vector for all the occupants (n) disposed on the vehicle, m represents a number of emotional states, and $w_i$ represents the weight for the classification of the associated occupant;
map the n-occupant emotion vector to a plurality of interior control settings;
determine a predicted interior control setting for the at least one occupant in response to the at least one processor mapping the n-occupant emotion vector to a plurality of interior control settings;
receive the environment input signal from the environment input device;
determine an environment context vector based on an environment of the vehicle in response to the at least one processor receiving the environment input signal from the at least one environment input device, wherein the environment context vector is defined as:

$$EC_x=[\{ctxt\_type\_1:pri\_val\}, \ldots \{ctxt\_type\_x:v_x\}]$$

where $EC_x$, represents the environment context vector; ctxt_type_1:pri_val represents a numerical value of a first environment context having a first prioritized value, and ctxt_type_x:pri_val represents a numerical value of the xth environment context having a prioritized value;
map the environment context vector to a plurality of interior control settings;
determine the predicted interior control setting for the at least one occupant in further response to the at least one processor mapping the environment context vector to the plurality of interior control settings;
generate an actuation signal associated with the predicted interior control setting in response to the at least one processor determining the predicted interior control setting; and
at least one actuator electronically communicating to the at least one processor and at least one vehicle component, where the at least one actuator actuates the at least one vehicle component based on the predicted interior control setting, in response to the at least one actuator receiving the actuation signal from the at least one processor.

9. The interior control setting system of claim 8 wherein the at least one actuator comprises a volume microcontroller, and the at least one vehicle component comprises a speaker, where the volume microcontroller adjusts a volume of the speaker to a predetermined volume associated with the predicted interior control setting in response to the volume microcontroller receiving the actuation signal.

10. The interior control setting system of claim 9 wherein the at least one actuator further comprises a display microcontroller, and the at least one vehicle component further comprises a display device, where the display microcontroller adjusts a brightness of the display device to a predetermined brightness level associated with the predicted interior control setting in response to the display microcontroller receiving the actuation signal.

11. The interior control setting system of claim 10 wherein the at least one actuator further comprises a motor and the at least one vehicle component further comprises a damper, where the motor moves the damper to one of a fresh air position for directing fresh air into the interior of the passenger cabin and a recirculating position for returning recirculated air into the interior of the passenger cabin associated with the predicted interior control setting in response to the motor receiving the actuation signal.

12. The interior control setting system of claim 11 wherein the at least one actuator further comprises an LED microcontroller and the at least one vehicle component further comprises a plurality of LEDs for emitting a plurality of colors, where the LED microcontroller actuates at least a portion of the LEDs to emit a predetermined color associated with the predicted interior control setting in response to the LED microcontroller receiving the actuation signal.

13. The interior control setting system of claim 12 wherein each of the classification has a prioritized weight, where the prioritized weight associated with each of the classification is different from one another.

14. The interior control setting system of claim 8 wherein the environment input signal indicates that the current environment is associated with a restricted driving condition, where the restricted driving condition includes at least one of a predetermined time of day, a pair of predetermined geolocation coordinates, a hospital zone, a construction zone, a school zone, a residential area, a zone of religious worship, an inclement weather, and an emergency vehicle, and the at least one processor is further programmed to determine the predicted interior control setting further based on the restricted driving zone.

* * * * *